US008923917B2

(12) United States Patent
Feng

(10) Patent No.: US 8,923,917 B2
(45) Date of Patent: Dec. 30, 2014

(54) ANTI-CRACK METHOD AND DEVICE FOR NETWORK-LOCKED MOBILE TERMINAL, AND NETWORK-LOCKED MOBILE TERMINAL

(75) Inventor: Kai Feng, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 356 days.

(21) Appl. No.: 13/505,693

(22) PCT Filed: Apr. 23, 2010

(86) PCT No.: PCT/CN2010/072167
§ 371 (c)(1),
(2), (4) Date: May 2, 2012

(87) PCT Pub. No.: WO2010/145331
PCT Pub. Date: Dec. 23, 2010

(65) Prior Publication Data
US 2012/0220269 A1 Aug. 30, 2012

(30) Foreign Application Priority Data
Nov. 2, 2009 (CN) .......................... 2009 1 0236837

(51) Int. Cl.
*H04M 1/00* (2006.01)
*H04W 12/08* (2009.01)

(52) U.S. Cl.
CPC .................................... *H04W 12/08* (2013.01)
USPC .................. 455/554.1; 455/432.1; 455/435.1; 455/435.2; 455/434

(58) Field of Classification Search
CPC . H04L 63/0853; H04L 63/0442; H04L 63/10; H04L 63/12; H04M 3/387; H04M 15/47; H04M 1/66; H04M 1/72577; H04M 2215/0148; H04K 2203/16
USPC ........... 455/410, 411, 458, 554.1, 555, 554.2, 455/432.1–433, 434, 435.1, 435.2; 726/35
See application file for complete search history.

(56) References Cited

U.S. PATENT DOCUMENTS 5,600,708 A 2/1997 Meche et al.
(Continued)

FOREIGN PATENT DOCUMENTS

CN 101026834 A 8/2007
CN 101043327 A 9/2007

OTHER PUBLICATIONS

International Search Report on international application No. PCT/CN2010/072167, mailed on Aug. 19, 2010.
(Continued)

*Primary Examiner* — Nathan Mitchell
*Assistant Examiner* — Dung Lam
(74) *Attorney, Agent, or Firm* — LeClairRyan, a Professional Corporation

(57) ABSTRACT

An anti-crack method for a network-locked mobile terminal is provided. The method includes the following steps: when a mobile terminal starts up, a Subscriber Identity Module (SIM) card reports first network lock information to the mobile terminal; when the mobile terminal is in an activated network-locked state, it judges whether the first network lock information is legal; if the first network lock information is illegal, the mobile terminal locks the SIM card; and if the first network lock information is legal, the mobile terminal initiatively read the second network lock information and judge whether the second network lock information is legal; if the second network lock information is legal, the mobile terminal begins to search the network; and if the second network lock information is illegal, the mobile terminal locks the SIM card. Accordingly, a network-locked mobile terminal is provided, which includes: a SIM card, an activation judging module, a network locking module, a network searching module, a card locking module, and an anti-crack device. An anti-crack device for the network-locked mobile terminal is also provided, which includes: an initialization judging unit, a reading unit, and a judgment unit. Thus, the present method is able to prevent the network-locked mobile terminal from being cracked.

3 Claims, 3 Drawing Sheets

(56) References Cited

U.S. PATENT DOCUMENTS

| | | | |
|---|---|---|---|
| 6,445,914 B1* | 9/2002 | Findikli et al. | 455/411 |
| 8,326,268 B2* | 12/2012 | Ahn et al. | 455/411 |
| 2006/0111149 A1* | 5/2006 | Chitrapu et al. | 455/562.1 |
| 2007/0155363 A1* | 7/2007 | Rager et al. | 455/410 |
| 2008/0003980 A1* | 1/2008 | Voss et al. | 455/411 |
| 2008/0005577 A1* | 1/2008 | Rager et al. | 713/183 |
| 2008/0125116 A1* | 5/2008 | Jiang | 455/433 |
| 2010/0095364 A1* | 4/2010 | Norgaard et al. | 726/9 |

OTHER PUBLICATIONS

English Translation of the Written Opinion of the International Search Authority in international application number: PCT/CN2010/072167, mailed on Aug. 19, 2010.

* cited by examiner

ANTI-CRACK METHOD AND DEVICE FOR NETWORK-LOCKED MOBILE TERMINAL, AND NETWORK-LOCKED MOBILE TERMINAL This application is a national stage application under 35 U.S.C. §371 from PCT Application No. PCT/CN2010/072167, filed Apr. 23, 2010, which claims the priority benefit of China Application No. 200910236837.5, filed Nov. 2, 2009.

TECHNICAL FIELD

The present disclosure relates to network-locked communication technology, and particularly to an anti-crack method and device for a network-locked mobile terminal, and a network-locked mobile terminal.

BACKGROUND

With the development of mobile communications, mobile terminals have been widely used around the world. Vigorous competitions exist among different mobile communication operators in order to seize the markets. At present, in order to enlarge market shares, operators usually purchase a large number of mobile terminals from mobile terminal manufacturers in a centralized way, and require the purchased mobile terminals to be locked to the networks operated by them. Then, the operators bind the purchased mobile terminals to a very favorable set and sell them with the mobile terminals marked at junk prices (which is referred to as subsidies), in a bid to quickly increase their market shares.

The foresaid mobile terminals are all network-locked mobile terminals, so they cannot work normally and find a network unless a SIM (Subscriber Identity Module) card from a specific operator is inserted. However, an Unlock SimCard that can crack network-locked mobile terminals has been developed. The Unlock SimCard is similar to the SIM card and can crack almost all network-locked mobile terminals of predominant brands in the market. The Unlock SimCard paralyzes the network-locked function of mobile terminals, brings the huge amount of subsidies made by operators to naught, affects the market shares of the operators and seriously impairs their interests. To tackle this problem, operators urgently need an anti-crack method for network-locked mobile terminals to protect their interests from being infringed.

SUMMARY

For this reason, the main object of the disclosure is to provide an anti-crack method and device for a network-locked mobile terminal, and a network-locked mobile terminal, which are capable of prevent the network-locked mobile terminal from being cracked.

To achieve the foregoing object, the disclosure provides an anti-crack method for a network-locked mobile terminal, which includes: when the mobile terminal starts up, reporting, by a Subscriber Identity Module (SIM) card, first network lock information to the mobile terminal; when the mobile terminal is in an activated network-locked state, judging whether the first network lock information is legal; if the first locking network information is illegal, locking the SIM card, and if the first network lock information is legal, initiatively reading second network lock information and judging whether the second network lock information is legal; and if the second network lock information is legal, beginning to search the network, and if the second network lock information is illegal, locking the SIM card.

Specifically, the initiatively reading the second network lock information may include:

judging whether the SIM card has completed initialization; and if the initialization has not been completed, allowing the SIM card to continue the initialization; and if the initialization has been completed, initiatively reading the second network lock information.

In the method above, the first network lock information may include a Mobile Country Code (MCC) and a Mobile Network Code (MNC), or an Integrated Circuit Card Identity (ICCID); when the MCC and MNC are used as the first network lock information, the judging whether the first network lock information is legal may include: judging whether the MCC and MNC reported by the SIM card are identical to corresponding information in an International Mobile Subscriber Identity (IMSI) stored in the mobile terminal; if identical, determining the first network lock information as legal; and if not identical, determining the first network lock information as illegal; or, when ICCID is used as the first network lock information, the judging whether the first network lock information is legal may include: judging whether the ICCID reported by the SIM card is identical to an ICCID stored in the mobile terminal; if identical, determining the first network lock information as legal; and if not identical, determining the first network lock information as illegal.

Specifically, the second network lock information may include an IMSI or an ICCID; when the IMSI is used as the second network lock information, the judging whether the second network lock information is legal may include: judging whether the read IMSI is identical to an IMSI stored in the mobile terminal; if identical, determining the second network lock information as legal; and if not identical, determining the second network lock information as illegal; or, when the ICCID is used as the second network lock information, the judging whether the second network lock information is legal may include: judging whether the read ICCID is identical to an ICCID stored in the mobile terminal; if identical, determining the second network lock information as legal; and if not identical, determining the second network lock information as illegal.

In order to realize the method, the disclosure provides a network-locked mobile terminal, which includes a SIM card, an activation judging module, a network locking module, a network searching module, a card locking module and an anti-crack device, wherein the SIM card is configured to report first network lock information to the network locking module; the activation judging module is configured to judge whether the network-locked mobile terminal is in an activated network-locked state, and to inform the network locking module when the mobile terminal is in the activated network-locked state; the network locking module is configured to receive the first network lock information, to judge whether the first network lock information is legal when the network-locked mobile terminal is in the activated network-locked state, and to inform the card locking module when the first network lock information is illegal, and to inform the card locking module when the first network lock information is illegal; the network searching module is configured to search the network; the card locking module is configured to lock the SIM card; and the anti-crack device is configured to initiatively read second network lock information, to judge whether the second network lock information is legal, to inform the network searching module when the second network lock information is legal, and to inform the card locking module when the second network lock information is illegal.

Specifically, the anti-crack device may be specifically configured to judge periodically whether the SIM card has completed initialization, to initiatively read the second network lock information when the SIM card has completed the initialization, and to judge again whether the SIM card has completed the initialization after a predetermined time interval if the SIM card has not completed the initialization; and the activation judging module is further configured to inform the network searching module when the network-locked mobile terminal is in an inactivated network-locked state.

In the network-locked mobile terminal above, the anti-crack device may include an initialization judging unit, a reading unit and a judging unit, wherein the initialization judging unit is configured to judge periodically whether the SIM card has completed the initialization, and to inform the reading unit when the initialization is completed; the reading unit is configured to initiatively read the second network lock information after the SIM card completes the initialization; the judgment unit is configured to judge whether the second network lock information is legal, to inform the network-locked mobile terminal to search the network when the second network lock information is legal, and to inform the network-locked mobile terminal to lock the SIM card when the second network lock information is illegal.

Specifically, the first network lock information may include an MCC and an MNC, or may include an ICCID; and the second network lock information may include an IMSI, or, may include the ICCID.

Correspondingly, the disclosure further provides an anti-crack device for network-locked mobile terminal, wherein the anti-crack device is configured to initiatively read second network lock information, to judge whether the second network lock information is legal when an Subscriber Identity Module (SIM) card completes an initialization, and to inform the network-locked mobile terminal to search network when the second network lock information is legal, and to inform the network-locked mobile terminal to lock the SIM card when the second network lock information is illegal.

Specifically, the anti-crack device may include an initialization judging unit, a reading unit and a judging unit, wherein the initialization judging unit is configured to judge periodically whether the SIM card has completed the initialization, and to inform the reading unit when the initialization is completed; the reading unit is configured to initiatively read the second network lock information when the SIM card completes the initialization; the judgment unit is configured to judge whether the second network lock information is legal, to inform the network-locked mobile terminal to search network when the second network lock information is legal, and to inform the network-locked mobile terminal to lock the SIM card when the second network lock information is illegal; and the first network lock information, may include an MCC and an MNC, or may include an ICCID; and the second network lock information may include an IMSI, or, may include the ICCID.

From the foregoing technical scheme, it may be seen that in the disclosure, the IMSI of the SIM card are initiatively and forcibly read by using an MMI (Man Machine Interface) layer of the mobile terminal after the SIM card completes the initialization, whether the read IMSI is legal is judged, and prevents the network-locked mobile terminals from being cracked such as by means of an Unlock SimCard by making use of the true network lock information read from the SIM card. In this way, even if the cracking such as by means of the Unlock SimCard reports a false IMSI, the mobile terminal will still take the read true IMSI of the SIM card.

Further, the MCC, MNC, IMSI and ICCID are internationally universal information, so the disclosure is highly universal and is applicable to all mobile terminals of predominant brands in the market.

It should be noted that the disclosure is highly practical and easy to realize because it can determine the correctness of the network lock information in the SIM card as long as one knows some relevant information of the locked network, such as MCC/MNC, or IMSI, or ICCID, and reads correct network lock information from the SIM card and compares the relevant information of the locked network and the read correct network lock information from the SIM card.

Therefore, the anti-crack method for network-locked mobile terminal provided by the disclosure can prevent hackers from cracking the network-locked mobile terminals such as by means of an Unlock SimCard, thereby meeting the need for anti-cracking of the mobile terminal.

DETAILED DESCRIPTION

The basic principle of the disclosure lies in that the mobile terminal judges whether the first network lock information and the second network lock information are legal based on the first network lock information reported by the SIM card and the initiatively read second network lock information, and the mobile terminal begins to search the network if they are both legal; otherwise stops searching the network.

It should be noted that the first network lock information includes an MCC and an MNC, or includes an ICCID; and the second network lock information includes an IMSI, or, includes the ICCID, wherein the IMSI has 15 digits in total and its structure is MCC+MNC+MSIN (Mobile Subscriber Identification Number); the MCC typically has three digits in total, each country has only one MCC and the MCC of China is 460; and the MNC typically has two digits in total (the MNCs of some countries in South America have three digits). One operator adopts only one MNC, for example, the CDMA system of China Unicom adopts 03 as its MNC. Further, the mobile terminal includes the terminals performing mobile communication in a network-locked state, such as network-locked mobile phones. The ICCID described herein is the sole identification code of the SIM card. It is solidified in the SIM card of the mobile terminal and is a numeral consisting of 20 digits.

The disclosure will now be described by referring to the accompanying drawings and embodiments, from which its foregoing objects, features and advantages will be evident.

Figure 1:
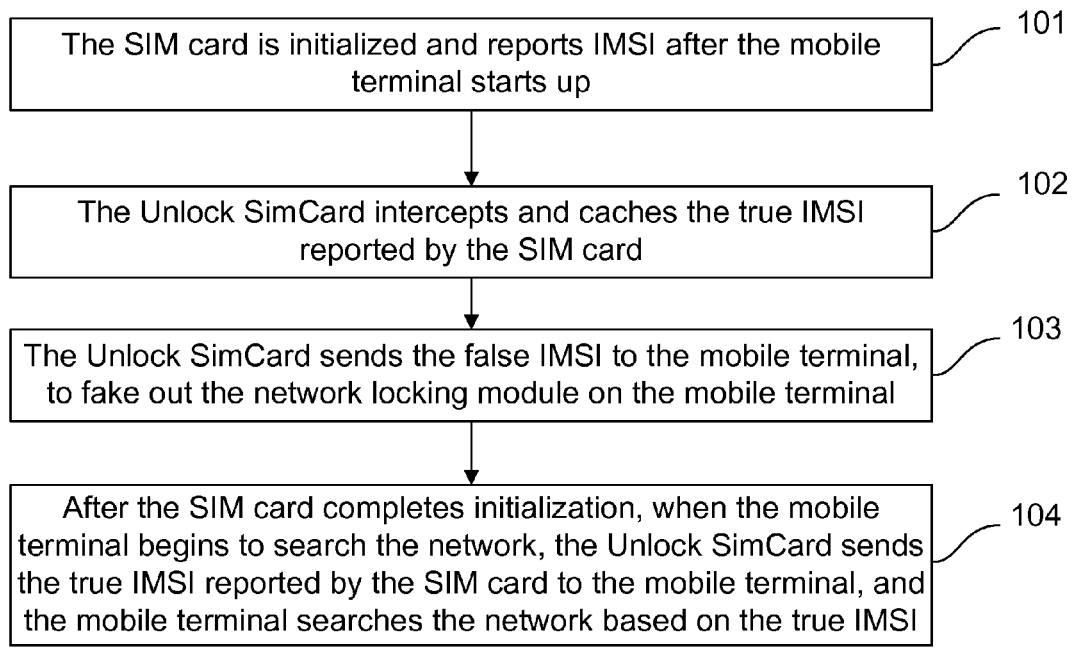
FIG. 1 is a schematic flow of cracking the network lock by Unlock SimCard.

Prior to detailed description of the preferred embodiments of the disclosure, the principle of Unlock SimCard for cracking network-locked is explained, as shown in FIG. 1. Here the Unlock SimCard may be assumed as a falsified SIM card, the Unlock SimCard and an ordinary SIM card together are inserted into a mobile terminal during use, and the Unlock SimCard has stored a false IMSI therein. The cracking process of the Unlock SimCard includes the following steps:

S101, the SIM card is initialized and reports IMSI after the mobile terminal starts up;

S102, the Unlock SimCard intercepts and caches the true IMSI reported by the SIM card;

S103, the Unlock SimCard sends the false IMSI to the mobile terminal, to fake out the network locking module on the mobile terminal;

Wherein, the network locking module is configured to implement the network locking function of the mobile terminal, and lock the network that the operator specifies the mobile terminal must use.

S104, after the SIM card completes the initialization, when the mobile terminal begins to search the network, the Unlock SimCard sends the true IMSI reported by the SIM card to the mobile terminal, and the mobile terminal searches the network based on the true IMSI.

Figure 2:
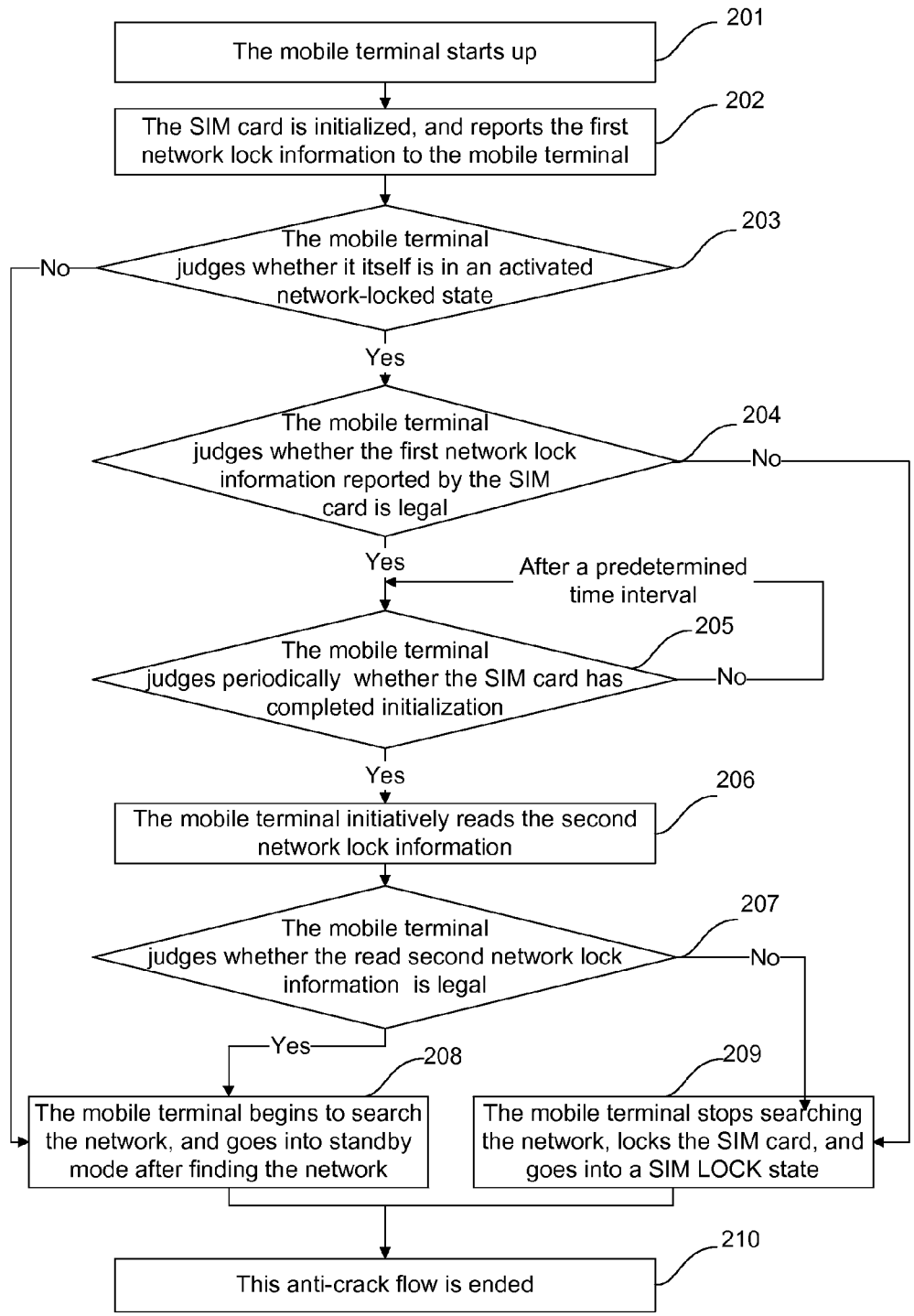
FIG. 2 is a schematic flow of an anti-crack method for network-locked mobile terminal provided by the disclosure.

Thus, the network locking module on the mobile terminal is unable to lock the network that the operator specifies the mobile terminal must use, paralyzing the network locking function of the mobile terminal and thereby achieving the goal of cracking the network lock. To tackle the cracking of network lock such as by means of the Unlock SimCard, the disclosure provides an anti-crack method for the network-locked mobile terminal. Its preferred embodiment is described in combination with FIG. 2 and mainly includes the following steps:

S201, the mobile terminal starts up;

S202, the SIM card is initialized and reports the first network lock information to the mobile terminal;

During initialization of the SIM card, the SIM card will automatically report information to the mobile terminal. The reported information may include the first network lock information, which includes MCC and MNC, or includes ICCID, or includes other information. This embodiment adopts the MCC and MNC reported by the SIM card as the first network lock information.

S203, the mobile terminal judges whether it itself is in an activated network-locked state, executes S204 if it is in an activated network-locked state, or executes S208 if it is in an inactivated network-locked state;

Prior to the search of the network, the mobile terminal judges whether it itself is in an activated network-locked state. That is to say, the mobile terminal judges whether it itself has activated the network-locking function. If the mobile terminal bears a network-locked activation tag, it means the mobile terminal is in an activated network-locked state and is a network-locked mobile terminal. If the mobile terminal does not bear a network-locked activation tag, it means the mobile terminal is in an inactivated network-locked state and is not a network-locked mobile terminal.

S204, the mobile terminal judges whether the first network lock information reported by the SIM card is legal, executes S205 if it is legal, and executes S209 if it is illegal;

Specifically, "judging whether the first network lock information is legal" includes: judging whether the MCC and MNC reported by the SIM card are identical to the corresponding information in the IMSI of the locked network stored by the mobile terminal itself; if identical, determining the first network lock information as legal; if not identical, determining the first network lock information as illegal. The corresponding information in the IMSI of the locked network refers to the MCC and MNC in the IMSI.

It should be noted that when the ICCID reported from the SIM card to the mobile terminal is used as the first network lock information, then "judging whether the first network lock information is legal" includes: judging whether the ICCID reported by the SIM card is identical with the ICCID stored in the mobile terminal; if identical, determining the first network lock information as legal; if not identical, determining the first network lock information as illegal.

S205, the mobile terminal judges periodically whether the SIM card has completed initialization, and judges again whether the SIM card has completed initialization after a predetermined time interval if the initialization is not completed, or executes S206 if the initialization is completed.

In this step, the mobile terminal may judge whether the SIM card has completed initialization based on whether the SIM cards has reported an initialization completion message. If it is found that the SIM card has reported the initialization completion message, it is determined that the SIM card has completed initialization. If no initialization completion message of the SIM card is found, it is determined that the SIM card has not completed initialization. Specifically, the predetermined time interval may be set within 0~10 min in general and a typical time interval adopted is 6 min.

S206, the mobile terminal initiatively reads the second network lock information.

Specifically, the second network lock information includes IMSI, or ICCID and other information in the SIM card. In this embodiment, the IMSI in the SIM card is used as the second network lock information. It is learnt from Global System for Mobile Communications (GSM) Protocol 11.11 that the file stored by the IMSI in the SIM card is an EFIMSI storage file. Therefore, this embodiment writes an anti-crack code in the MMI layer of the mobile terminal and initiatively and forcibly reads the IMSI in the SIM card. For example: after the SIM card completes initialization, the mobile terminal may invoke a function to initiatively read related network lock information stored in the SIM card, for instance: directly accessing the EFIMSI storage file to read the IMSI. In this way, even if a false IMSI is reported such as through a cracking method such as by means of an Unlock SimCard, the mobile terminal will still adopt the true IMSI of the SIM card read by the mobile terminal.

S207, the mobile terminal judges whether the read second network lock information is legal, executes S208 if legal, or executes S209 if illegal.

In this embodiment, if the second network lock information is IMSI in the SIM card, then judging whether the read IMSI is legal includes: judging whether the read true IMSI is identical with the corresponding information in the IMSI of the locked network stored in the mobile terminal. If identical, determining the second network lock information as legal. If not identical, determining the second network lock information as illegal. For example, if the mobile terminal is to be locked to the network of China Mobile, the mobile terminal reads IMSI from the SIM card and judges whether the read MCC and MNC in the IMSI are identical with 460 and 00 in the stored IMSI of the locked network. If identical, determining the second network lock information as legal.

It should be noted that if the initiatively read ICCID in the SIM card is used as the second network lock information in this embodiment, then "judging whether the second network lock information is legal" mainly includes: judging whether the read ICCID is identical with the ICCID stored by the mobile terminal; if identical, determining the second network lock information as legal; if not identical, determining the second network lock information as illegal.

It should be noted that it needs to judge the legality of network lock information twice in this embodiment and adopts legal MCC and MNC, or legal IMSI, as the judgment basis, i.e.: adopts the MCC and MNC of the locked network stored by the mobile terminal, or the stored IMSI of the locked network as the judgment basis. They may be called the MCC and MNC stored by the mobile terminal, or stored IMSI, respectively. In other words, when the mobile terminal judges the legality of network lock information for the first time, it judges the legal MCC and MNC with the MCC and MNC stored by the mobile terminal; when the mobile terminal judges the legality of network lock information for the second time, it compares the legal IMSI with the IMSI stored by the mobile terminal.

Further, the mobile terminal may initiatively reads all information of IMSI, or only reads the corresponding MCC and MNC in the IMSI, and then compare the read MCC and MNC in the IMSI with the corresponding MCC and MNC of the legal IMSI stored by the mobile terminal. For example, the read MCC and MNC in the first eight digits of the IMSI are compared with the corresponding information of the legal IMSI. Specifically, the first eight digits of the IMSI contain MCC, MNC and some fixed characters. The reason why the first eight digits of IMSI are defined as the reading and comparison range is for reading complete MCC and MNC.

S208, the mobile terminal begins to search the network, enters a standby mode after finding the network, and executes S210;

S209, the mobile terminal stops searching the network, locks the SIM card, enters a SIM LOCK state, and executes S210;

When the first and second network lock information is illegal, the mobile terminal will disconnect the network, lock the SIM card and enters the SIM LOCK state.

S210, the anti-crack flow is ended.

For the sake of simple description, the foregoing embodiments are all represented as a series of motion combinations, but those skilled in the art should understand the disclosure is not limited by the described motion sequence because some steps may adopt other sequences or be performed simultaneously according to the disclosure.

Figure 3:
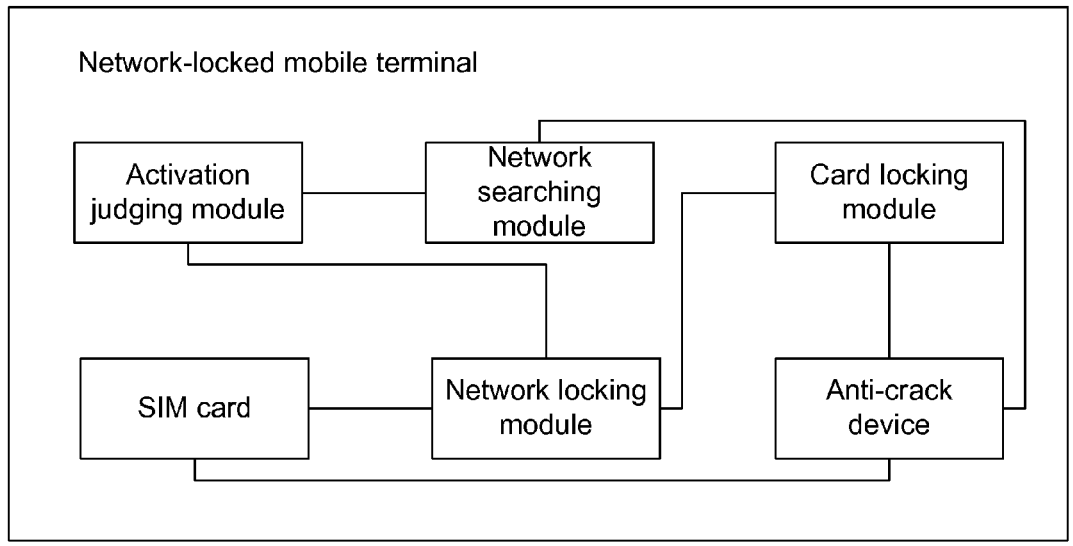
FIG. 3 is a schematic structural drawing of the network-locked mobile terminal provided by the disclosure.

To realize the foregoing method, the disclosure also provides a network-locked mobile terminal, as shown in FIG. 3, which includes a SIM card, an activation judging module, a network locking module, a network searching module, a card locking module and an anti-crack device, wherein the SIM card is configured to report the first network lock information to the network locking module during initialization;

the activation judging module is configured to judge whether the network-locked mobile terminal is in an activated network-locked state, and to inform the network locking module when the mobile terminal is in an activated network-locked state, and to inform the network searching module when the mobile terminal is in an inactivated network-locked state;

the network locking module is configured to receive the first network lock information, to judge whether the first network lock information is legal when the network-locked mobile terminal is in an activated network-locked state, and to inform the card locking module when the first network lock information is illegal, and to inform the card locking module when the first network lock information is illegal;

the network searching module is configured to search the network;

the card locking module is configured to lock the SIM card;

the anti-crack device is configured to initiatively read second network lock information and judge whether the second network lock information is legal, to inform the network searching module when the second network lock information is legal, and to inform the card locking module when the second network lock information is illegal.

Specifically, the anti-crack device is specifically configured to judge periodically whether the SIM card has completed initialization, to initiatively read the second network lock information when the SIM card has completed the initialization, and to judge again whether the SIM card has completed the initialization after a predetermined time interval if the SIM card has not completed the initialization. The first network lock information includes MCC and MNC, or includes ICCID; and the second network lock information includes IMSI, or includes ICCID.

Specifically, the activation judging module is also configured to inform the network searching module when the network-locked mobile terminal is in an inactivated network-locked state.

Accordingly, the disclosure may add an anti-crack device for network-locked mobile terminal in the upper-layer application of the network-locked mobile terminal, to prevent the network-locked mobile terminal from being cracked. During initialization of the SIM card, the network locking module of the network-locked mobile terminal will verify the first network lock information, i.e.: judge its legality. If it is illegal, the SIM card will be locked and the network will be disconnected and the anti-crack device will not be started. If it is legal, the anti-crack device will acquire and judge the legality of the second network lock information after the SIM card completes the initialization.

Figure 4:
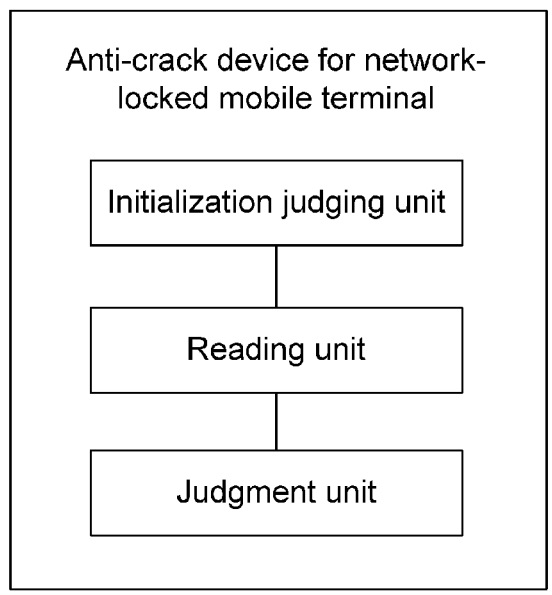
FIG. 4 is a schematic structural drawing of an anti-crack device for network-locked mobile terminal provided by the disclosure.

Specifically, the anti-crack device is configured to initiatively read the second network lock information and judge whether the second network lock information is legal after the SIM card completes initialization, inform the network-locked mobile terminal to search the network when the second network lock information is legal, and inform the network-locked mobile terminal to lock the SIM card when the second network lock information is illegal. Below the structural composition of the anti-crack device is further described, as shown in FIG. 4. The anti-crack device mainly includes an initialization judging unit, a reading unit and a judgment unit, wherein the initialization judging unit is configured to judge periodically whether the SIM card has completed the initialization, and inform the reading unit when the initialization is completed;

the reading unit is configured to initiatively read the second network lock information after the SIM card completes the initialization;

the judgment unit is configured to judge whether the second network lock information is legal, inform the network-locked mobile terminal to search the network when the second network lock information is legal, and inform the network-locked mobile terminal to lock the SIM card when the second network lock information is illegal.

Specifically, the first network lock information includes an MCC and an MNC, or includes an ICCID; and the second network lock information includes IMSI, or includes ICCID.

The descriptions of the foregoing embodiments have different emphases. Those not described in details in an embodiment may be referred to the relevant descriptions of other embodiments. The foregoing descriptions are preferred embodiments of the disclosure. They are only intended to describe and explain the disclosure and not to limit the protection scope of the disclosure. All modifications and equivalent replacements made without departing from the spirit and principle of the disclosure shall be within the protection scope of the disclosure.

What is claimed is:

1. A network-locked mobile terminal, comprising a Subscriber Identity Module (SIM) card, an activation judging module, a network locking module, a network searching module, a card locking module and an anti-crack device, wherein the SIM card is configured to report first network lock information to the network locking module;

the activation judging module is configured to judge whether the network-locked mobile terminal is in an activated network-locked state, and to inform the network locking module when the mobile terminal is in the activated network-locked state;

the network locking module is configured to receive the first network lock information, to judge whether the first network lock information is legal when the network-locked mobile terminal is in the activated network-locked state, and to inform the card locking module when the first network lock information is illegal, and to inform the card locking module when the first network lock information is illegal;

the network searching module is configured to search the network;

the card locking module is configured to lock the SIM card;

the anti-crack device is configured to initiatively read second network lock information, to judge whether the second network lock information is legal, to inform the network searching module when the second network lock information is legal, and to inform the card locking module when the second network lock information is illegal; and further wherein the anti-crack device comprises an initialization judging unit, a reading unit and a judging unit, wherein the initialization judging unit is configured to judge periodically whether the SIM card has completed the initialization, and to inform the reading unit when the initialization is completed;

the reading unit is configured to initiatively read the second network lock information when the SIM card completes the initialization;

the judgment unit is configured to judge whether the second network lock information is legal, to inform the network-locked mobile terminal to search network when the second network lock information is legal, and to inform the network-locked mobile terminal to lock the SIM card when the second network lock information is illegal.

2. The network-locked mobile terminal according to claim 1, wherein the activation judging module is further configured to inform the network searching module when the network-locked mobile terminal is in an inactivated network-locked state.

3. The network-locked mobile terminal according to claim 1, wherein the first network lock information comprises a Mobile Country Code (MCC) and a Mobile Network Code (MNC), or comprises an Integrated Circuit Card Identity (ICCID); and the second network lock information comprises an International Mobile Subscriber Identity (IMSI), or comprises the ICCID.

* * * * *